(12) United States Patent
Castro et al.

(10) Patent No.: US 9,282,013 B2
(45) Date of Patent: *Mar. 8, 2016

(54) TRANSPARENTLY TRACKING PROVENANCE INFORMATION IN DISTRIBUTED DATA SYSTEMS

(71) Applicant: INTERNATIONAL BUSINESS MACHINES CORPORATION, Armonk, NY (US)

(72) Inventors: Paul C. Castro, Sharon, MA (US); Marco Pistoia, Amawalk, NY (US); John Ponzo, Shrub Oak, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/029,134

(22) Filed: Sep. 17, 2013

(65) Prior Publication Data

US 2014/0223000 A1 Aug. 7, 2014

Related U.S. Application Data

(63) Continuation of application No. 13/761,916, filed on Feb. 7, 2013.

(51) Int. Cl.
*G06F 9/44* (2006.01)
*G06F 9/45* (2006.01)
*H04L 12/26* (2006.01)
*G06F 9/00* (2006.01)
*H04L 29/06* (2006.01)
*H04L 29/08* (2006.01)

(52) U.S. Cl.
CPC *H04L 43/08* (2013.01); *G06F 9/00* (2013.01); *H04L 63/12* (2013.01); *H04L 63/123* (2013.01); *H04L 67/10* (2013.01)

(58) Field of Classification Search
USPC .......................................................... 717/130
See application file for complete search history.

(56) References Cited

U.S. PATENT DOCUMENTS

| | | | |
|---|---|---|---|
| 5,450,586 A * | 9/1995 | Kuzara et al. | 717/124 |
| 7,539,753 B2 | 5/2009 | Amini et al. | |
| 7,730,458 B2 * | 6/2010 | Isakov et al. | 717/128 |
| 8,229,775 B2 | 7/2012 | Adler et al. | |
| 8,856,313 B2 * | 10/2014 | Amini et al. | 709/224 |
| 8,949,809 B2 * | 2/2015 | Varma et al. | G06F 8/443 717/150 |
| 8,972,334 B2 * | 3/2015 | Castro et al. | 707/600 |
| 2007/0234270 A1 * | 10/2007 | Cohen et al. | 717/100 |
| 2010/0023533 A1 * | 1/2010 | Celi et al. | 707/100 |
| 2010/0114628 A1 * | 5/2010 | Adler et al. | 705/7 |
| 2011/0218920 A1 | 9/2011 | Agrawal et al. | |
| 2011/0238279 A1 * | 9/2011 | Suetsugu et al. | 701/102 |
| 2012/0054146 A1 | 3/2012 | Gupta et al. | |
| 2012/0174076 A1 * | 7/2012 | Rajic | G06F 11/3466 717/128 |
| 2013/0205281 A1 * | 8/2013 | Pizlo et al. | 717/128 |

(Continued)

*Primary Examiner* — Marina Lee
(74) *Attorney, Agent, or Firm* — Tutunjian & Bitetto, P.C.; Daniel P. Morris (57) ABSTRACT

Systems for enabling an application to track provenance include an application analysis module configured to analyze an application binary to discover injection points for provenance tracking code; and an instruction alteration module configured to overwrite instructions in the application binary at the injection points to create an instrumented application. The overwritten instructions link the application binary to one or more instrumented libraries that invoke a provenance layer to track data operations.

10 Claims, 5 Drawing Sheets

(56) References Cited

U.S. PATENT DOCUMENTS

| | | | |
|---|---|---|---|
| 2013/0232476 A1* | 9/2013 | Varma | G06F 8/443 717/150 |
| 2014/0181023 A1* | 6/2014 | Castro et al. | 707/634 |
| 2014/0181025 A1* | 6/2014 | Castro et al. | 707/634 |
| 2014/0222994 A1* | 8/2014 | Castro et al. | 709/224 |
| 2014/0223000 A1* | 8/2014 | Castro et al. | 709/224 |

* cited by examiner

TRANSPARENTLY TRACKING PROVENANCE INFORMATION IN DISTRIBUTED DATA SYSTEMS

RELATED APPLICATION INFORMATION

This application is a Continuation application of co-pending U.S. patent application Ser. No. 13/761,916 filed on Feb. 7, 2013, incorporated herein by reference in its entirety.

BACKGROUND

1. Technical Field

The present invention relates to tracking provenance information and, more particularly, to tracking provenance information in distributed systems by automatic embedding.

2. Description of the Related Art

Enterprises are increasingly interested in the area of data provenance, which involves tracking the lineage of data in a computing system. Understanding the pedigree of data is important when determining whether to trust that data, a process that is involved in many enterprise activities such as maintaining data retention compliance, audits of business processes, and tracking data security. Provenance assists in understanding how data evolves; provenance systems can keep information about how data is created, transformed, and replicated across different nodes in a distributed system.

In existing provenance systems, the provenance tracking capability is deliberately added as a data management system that runs in parallel with the system being observed. Access to the internals of the observed systems is needed to insert tracking code that is specifically configured for the system. In some cases, provenance tracking can be accomplished with less-invasive integration, e.g. tracking provenance gained from observing network traffic. However, this is limited in scope, such that more invasive approaches are needed to collect detailed provenance information that is potentially required, e.g. tracking the version history of a data item that is never sent over a network.

Furthermore, existing provenance tracking systems are typically applied to enterprise applications using enterprise storage, where access to the internals of the storage systems is available. However, there is a trend where enterprises are allowing their employees to use consumer devices and applications (sometimes called Bring-Your-Own-Device or BYOD). In this environment, it is useful to track provenance even if the user is using a non-enterprise application and storage provider. However, existing applications and devices do not support this type of provenance tracking, and there is no prospect for developers of such applications to introduce such features.

SUMMARY

A method for enabling an application to track provenance information is shown that includes analyzing an application binary to discover injection points for provenance tracking code; overwriting instructions in the application binary at the injection points with a processor to create an instrumented application, wherein the overwritten instructions link the application binary to one or more instrumented libraries that invoke a provenance layer to track data operations; and deploying the instrumented application on a client device.

A method for tracking provenance information is shown that includes catching and logging data events performed by an instrumented application at a provenance layer with a processor, wherein overwritten instructions link the instrumented application binary to one or more instrumented libraries that invoke the provenance layer to track data operations; and creating a provenance log that includes the logged data events.

A system for enabling an application to track provenance information is shown that includes an application analysis module configured to analyze an application binary to discover injection points for provenance tracking code; and an instruction alteration module comprising a processor configured to overwrite instructions in the application binary at the injection points to create an instrumented application, wherein the overwritten instructions link the application binary to one or more instrumented libraries that invoke a provenance layer to track data operations.

A system for tracking provenance information is shown that includes an instrumented application binary on a client device, wherein overwritten instructions link the instrumented application binary to one or more instrumented libraries that invoke a provenance layer to track data operations, wherein the provenance layer is configured to catch and log data events performed by the instrumented application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention tracks data in a distributed system. This task is complicated by data being copied and transformed, which can take place multiple times across nodes. Because a given data-transforming application may lack provenance tracking provisions, there has been no simple way to account for those applications in data tracking. The present invention provides tracking in these cases by automatically embedding provenance tracking into existing applications, and this can be performed even if the application's source code is not available. The application developer need not even be aware that provenance tracking is enabled and, from the application perspective, no special handling of data is needed.

Once embedded in the application, embodiments of the present invention can be configured to collect coarse-to-fine-grained provenance data. The configuration is not static, but can instead be done at runtime as provenance tracking needs change. A policy enforcement mechanism can also be provided to monitor provenance data and optimize data policies. For example, the present principles can minimize the energy cost of replicating data over a network of mobile devices by ensuring that data is only copied over lower-energy consuming networks.

Figure 1:
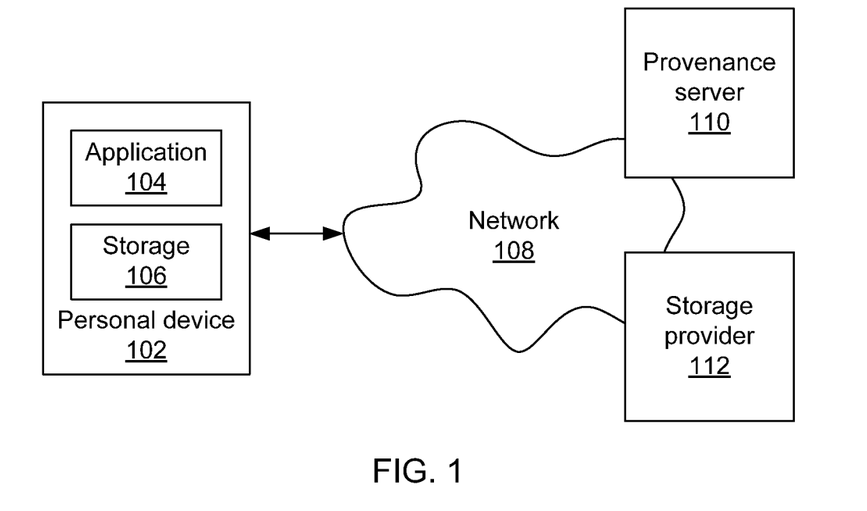
FIG. 1 is a diagram of a provenance tracking system in accordance with the present principles.

Referring now to the drawings in which like numerals represent the same or similar elements and initially to FIG. 1, a data provenance system is shown within an exemplary data flow network. A user's personal device 102 includes a local storage 106 and personal applications 104. The user device may include any device possessed or controlled by the user including, e.g., smartphones, desktop computers, laptop computers, flash memory devices, medical devices, etc. The personal device 102 communicates through a network 108 with, e.g., a provenance server 110 and a storage provider 112.

Many modern applications depend on network-based services to store data. Most of these services provide simple interfaces which allow the storage and retrieval of data by a file identifier and/or some limited, query-based interface. The trend of persisting data remotely from the application that uses it is likely to grow. The device 102 provides limited local storage 106 to applications 104 and depends on remote storage providers 112 for providing higher capacity storage.

There are three general types of storage: personal storage, enterprise storage, and consumer storage. In the realm of personal storage, users may have multiple devices 102 that synchronize with each other and may also have networked storage units 106 for, e.g., backup and restore functions. An application 104 may take advantage of these personal devices 102 to persist large data files and only keep frequently used files local to the application. For example, a smartphone camera application may store photos on a laptop computer and synchronize with that laptop, keeping only a subset of the pictures locally.

Many enterprises provide enterprise storage for applications to their employees. These can be considered storage providers 112 and are typically kept behind firewalls, requiring intranet or virtual private network access. A common example of enterprise storage is email storage, where emails are stored on the company email server and synchronized to the user's personal device 102 over an authenticated channel. Some enterprises may provide storage interfaces that applications can use to store and access the enterprise application data.

Because the enterprise typically will not have access to the source code of applications 104 on the user's personal device 102, it can be difficult to track the provenance of data that is processed by such applications. This concern also applies to instances where commodity applications are purchased for use by the enterprise.

The present embodiments provide provenance tracking in situations such as those shown in FIG. 1 by adding a provenance tracking layer to existing applications. Once added, such a provenance tracking layer can collect provenance data at runtime, and the configuration can be modified, should new provenance tracking needs arise. The provenance layer of application 104 can communicate with a provenance server 110, which can analyze provenance data from multiple instances. This analysis yields a data provenance model, which users can view in a provenance console. The provenance server 110 can also be used to optimize certain data-related options for applications that replicate data in a distributed system. For example, the data provenance server 110 can inform an application 104 that data should only be uploaded to a server 112 when it meets a sufficient cost threshold.

The provenance model may be any appropriate structure. In particular it is contemplated that the provenance model may be represented as a graph. Such a graph may take many forms. For example, each datum in the system would have an associated graph that describes the history of operations over that datum. Nodes in the graph represent operations and directed edges are temporal relationships between the operations, indicating that one operation takes place after the other. Another exemplary embodiment would have all data items in a single graph, where nodes represent individual data items and edges represent a replication relationship between them. Another exemplary embodiment would have all raw provenance events organized without processing in a log or a table, but instead being listed chronologically. These embodiments are described without limitation, and it is contemplated that those having ordinary skill in the art would be able to implement any appropriate provenance model in accordance with the present principles.

Figure 2:
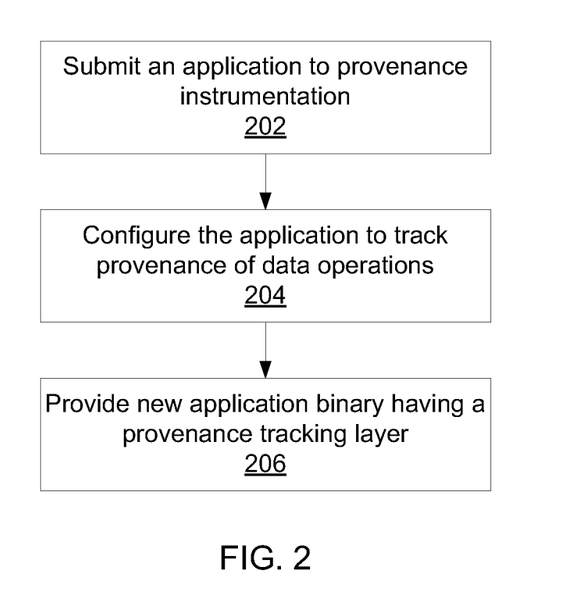
FIG. 2 is a block/flow diagram of a method for providing an instrumented application that tracks provenance information in accordance with the present principles.

Referring now to FIG. 2, a method for adding provenance tracking to an application is shown. Block 202 submits an existing application 104 for provenance instrumentation. Developers may create such an application using their tools of choice and simply provide a finished application binary. Block 204 automatically and transparently configures the submitted application 104 to track the provenance of data-related operations. This is accomplished by providing a provenance layer that monitors the application's data activities. Block 206 provides the modified application 104 for use. The application 104 can be deployed on client personal devices 102 using standard application installation procedures. The provenance layer is able to monitor system events that occur between the application 104 and the local storage 106.

For example, a provenance layer can track when the application 104 creates new files in the local filesystem. The provenance layer can also monitor events between the application and operations on a network-based storage provider 112. The provenance layer maintains a log of provenance data and either can locally process this log to create a data provenance model or can upload the provenance data to a remote provenance server which can perform any number of provenance data management tasks.

Block 204 analyzes the application binary to discover where to integrate the provenance tracking code. For example, in a Java® application, block 204 locates all instances in the binary where a ClassLoader is created. At these locations, block 204 inserts additional code to replace the standard ClassLoader definition with an instrumented ClassLoader.

Once the code is analyzed, provenance tracking components can be embedded. This includes instrumented libraries, configuration components, and network services components. Embedding may be accomplished through binary code injection, where binary instructions are overwritten in the original application. Block 204 then re-creates a deployable application by repacking the updated components with the original components. This may also include certifying he code by re-signing it with a cryptographic signature if needed.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
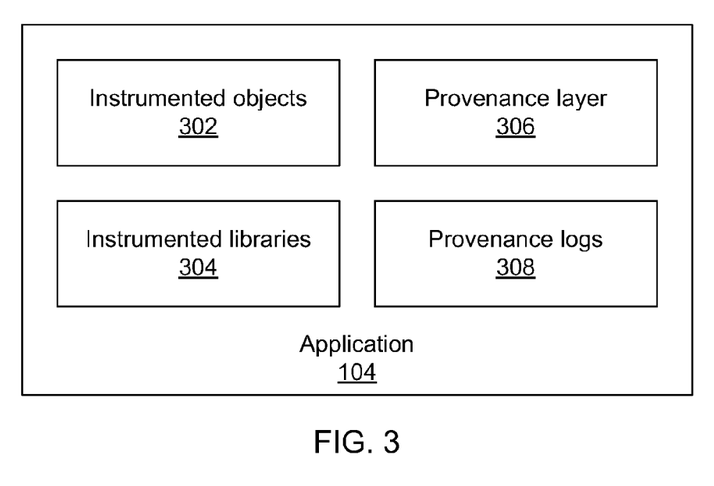
FIG. 3 is a diagram of an instrumented application in accordance with the present principles.

Referring now to FIG. 3, a detailed view of an application 104 is shown. The application 104 is built from software-based components and may include system libraries, which are provided by the platform. System libraries may include access to platform-level services, such as networking and storage, and well as provide building blocks for applications, such as user interface widgets.

Rather than linking to standard versions of the system libraries, the present principles transparently link the application 104 to an instrumented version of the components 302 and libraries 304 which is capable of collecting arbitrary data about the running application 104, such as which system calls it is making, when certain events or application function calls have occurred, and contextual information read from platform sensors. The instrumented components 302 are members of the instrumented libraries 304. In particular, the instrumented components 302 and libraries 304 are configured to track data-related events within the application 104, such as the creation and update of data files. The instrumented library 304 may be linked to the application by, for example, using code analysis and binary code injection to add new capabilities to applications, without the need for the original source code. In this case, a provenance layer 306 is transparently added as a part of the instrumented system libraries 304. During instrumentation, the provenance layer 306 is appended to the code of the application 104 and enabled at runtime.

The provenance layer 306 monitors data-related events reported by the instrumented components 302 as they interact with local storage 106. The provenance layer 306 maintains a provenance log 308 of data-related events, which can also be stored locally. Optionally, the provenance layer can upload the provenance log 308 periodically to a remote provenance server 110. The provenance server 110 aggregates provenance logs across multiple instances of the provenance layer 306 on different clients 102 to perform analytics. The provenance server 110 may further be configured to communicate with the instrumented components 302 to alter the behavior of the application.

As an example, consider a word processor application that writes documents to local storage 106. When the application 104 calls the file system service through system libraries 304, the provenance layer 306 can record the event that new data has been created in the provenance log 308. When the application 104 writes data into the file, the provenance layer 306 records that data is updated. Later, the application 104 may call upon the network 108 to copy the file to a network-based storage device 112. Since this is also done through the instrumented library 304, the provenance layer 306 can observe and record that data is replicated.

In the case of copying a file from the local storage 106 to remote storage 112, two instances of the provenance tracking system may be involved, each running independently of the other. The source provenance layer 306 reports that it has replicated data to a target client, while the target client records that it has received data from the source client. Expanding this principle across many instances of the provenance tracking system, it is possible to aggregate all events across all the different instances of the provenance tracking system at provenance server 110. The provenance server 110 can perform analysis on the events to create a data provenance model. One example of such a model is a snapshot of the location of all the data in a distributed system, including versioning information and changes performed on the data at each node. A history of snapshots may be maintained at the provenance server 110 to form a timeline of the evolution of data creation, transformation, and migration across the observed system. Such information is useful for many enterprise-related tasks, such as data audits, resource monitoring, and compliance.

The provenance server 110 can control the behavior of provenance layer 306 by issuing command and control messages. A messaging protocol, such as message queue telemetry transport (MQTT) can be used for communication from the instrumented libraries 304 to the provenance server 110. Based on the provenance information reported by provenance layer 306, the provenance server 110 may send configuration information and/or commands back to the client. For example, the provenance layer 306 may report that it is currently replicating data to storage provider A. Administrators may conclude that storage provider A is no longer acceptable and may reconfigure the application 104 to migrate its data to storage provider B. This includes both a new configuration (switch to provider B) and also the commands to perform the migration (e.g., copy data from A to B). These command and control messages may be triggered automatically according to a policy manager. For example, if a state model shows that data is copied from A to B, the policy may trigger a message to A that it should also copy the item to C to maintain data redundancy. Configuration at this level needs instrumentation that is specifically tailored for a given application 104.

Figure 4:
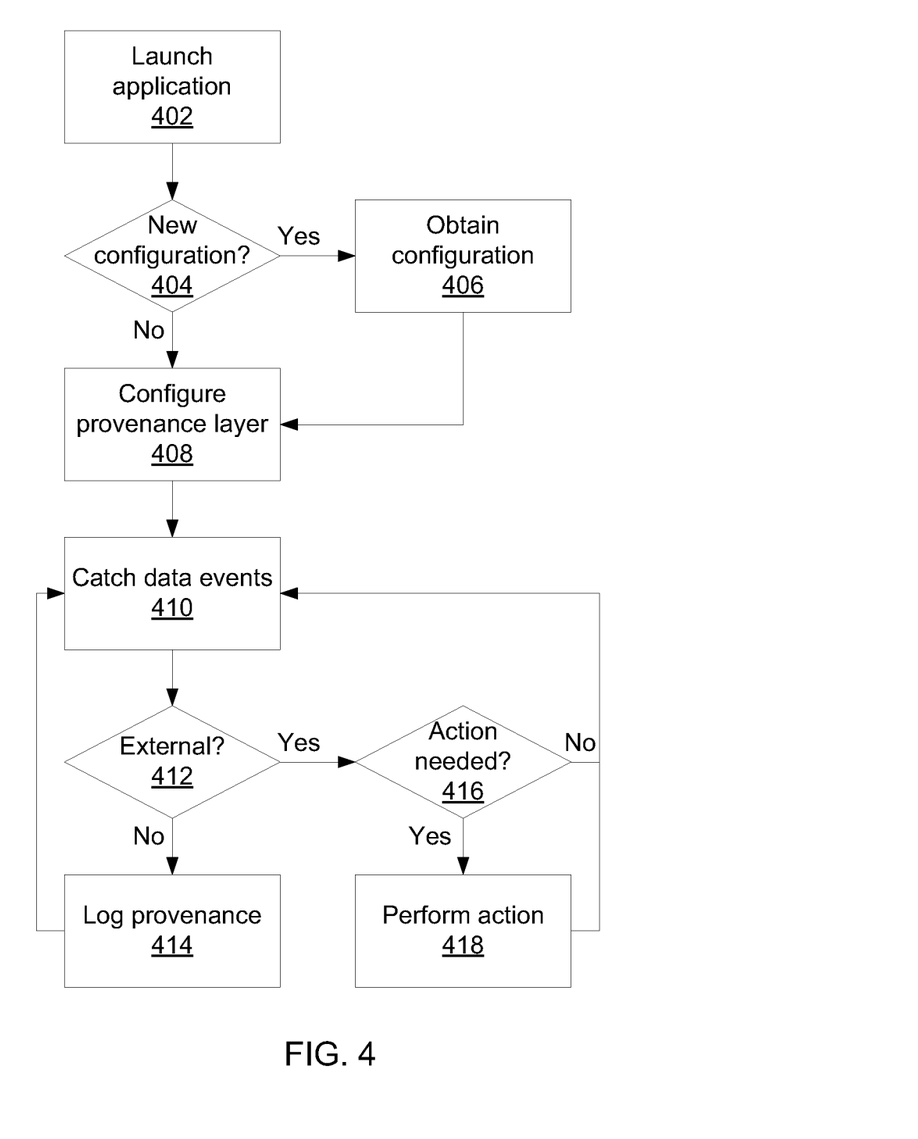
FIG. 4 is a block/flow diagram of a method for tracking provenance information in accordance with the present principles.

Referring now to FIG. 4, a method of provenance tracking is shown. Block 402 launches an application 104 that has had a provenance layer 306 added. When the provenance layer 306 instantiates, it loads in configuration information from a local policy file or, if the network is available, it may download the latest configuration information from the provenance server 110. Block 404 determines whether a new configuration is available and, if so, block 406 obtains the new configuration. Block 408 configures the provenance layer accordingly.

Once configured, the provenance layer 306 enters monitoring mode and waits for events from the instrumented components 302 at block 410. The instrumented components 302 maintain their original behavior so that, from an application standpoint, provenance tracking is unobtrusive and, ideally, completely invisible to the user. When the provenance layer 306 receives an event, it checks at block 412 whether the event is related to a local data action or if the event was received through network services from the provenance server 110. External events may call for a command to be followed, so the provenance layer 306 evaluates the external event at block 416 and takes any necessary action at block 418. If the event is internal, the provenance layer 306 logs that the event occurred at block 414 and returns to monitoring at block 410. This process continues for as long as the application 104 runs and generates a provenance log 308, either stored locally or communicated to the provenance server 110.

Figure 5:
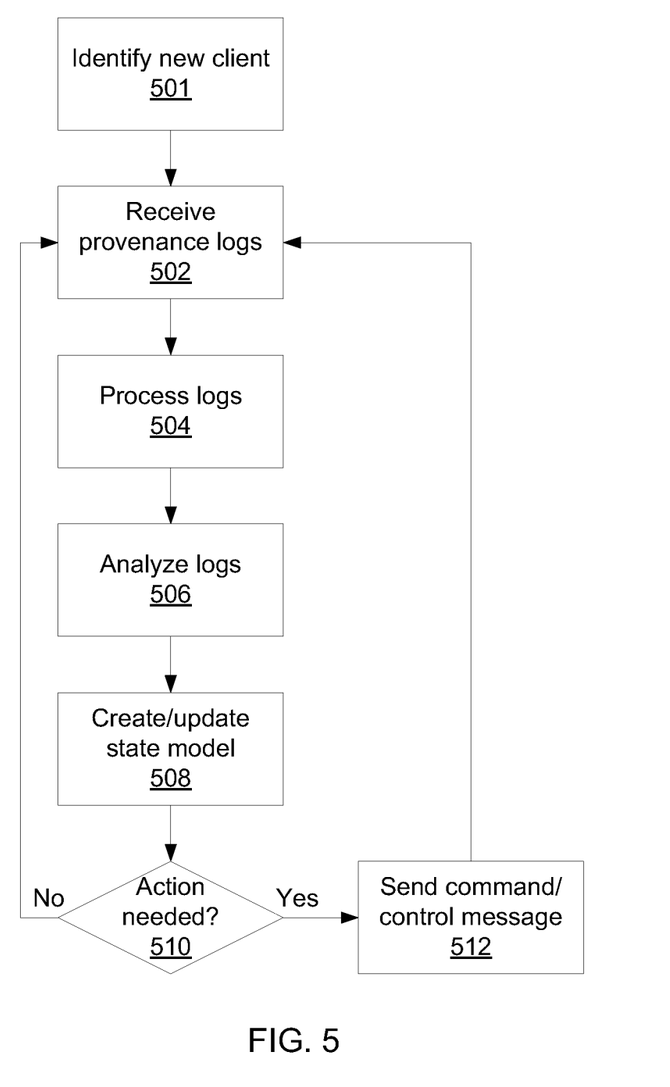
FIG. 5 is a block/flow diagram of a method for receiving provenance information from an instrumented application in accordance with the present principles.

Referring now to FIG. 5, a method of aggregating provenance events and taking action based on those events is shown. Because applications may be provided with a provenance layer 306 at any time, there will not necessarily be a list of known clients. As such, the provenance server 110 flexibly accepts provenance information from new users by identifying a new client at block 501. The provenance server 110 receives provenance logs 308 at block 502 from one or more devices 102. These devices 102 may have instrumented applications 104 as described above or may have provenance functions incorporated by design. At block 504 the provenance server processes the logs. Block 506 begins an analysis phase, where the provenance server 110 may pre-process the provenance logs 308 to clean up noisy data and then performs analysis on the logs 308. For example, such analysis may include creating or updating a state model at block 508.

An update to the state model at block 508 triggers a determination at block 510 of whether any action is dictated by the provenance server's policies. If so, block 512 generates a command/control message for the provenance layer 306 that is transmitted via network 108. Processing then returns to block 502 to receive further provenance logs 308.

It should be recognized that the flexible addition of new clients may be performed in any suitable manner to ensure that accurate information is provided to the provenance server 110. The provenance layer 306 may send authentication information or may otherwise be uniquely identified to allow the provenance server 110 to identify the particular client or device sending the information. The provenance server 110 may itself provide this information upon a first identification, such that the provenance layer 306 stores identity information in local storage 106 to use in future connections. By providing for the identification of new users, block 501 makes it possible for the provenance server 110 to flexibly adapt to the introduction of new clients.

Figure 6:
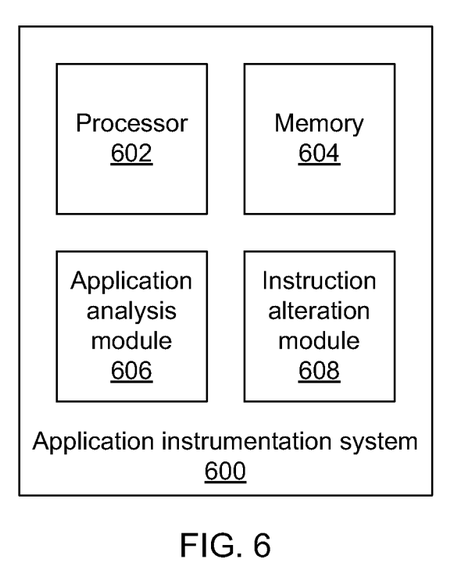
FIG. 6 is a diagram of an application instrumentation system in accordance with the present principles.

Referring now to FIG. 6, a diagram of an application instrumentation system 600 is shown. A memory 604 holds an application binary that lacks the ability to track provenance information. An application analysis module 606 reviews the application binary in memory to locate insertion points where provenance tracking code may be injected. An instruction alteration module 608 uses processor 602 to change instructions at the insertion points, such that those instructions call instrumented libraries 304 instead of their originally linked libraries.

Having described preferred embodiments of a system and method for transparently tracking provenance information in distributed data systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for enabling an application to track provenance information, comprising:
   an application analysis module configured to analyze an application binary to discover injection points for provenance tracking code, wherein said injection points correspond to existing library calls; and
   an instruction alteration module comprising a processor configured to overwrite instructions in the application binary at the injection points to create an instrumented application, wherein the overwritten instructions provide library calls to one or more instrumented libraries that invoke a provenance layer to track data operations.

2. The system of claim 1, wherein the provenance layer is configured to transmit provenance logs to a provenance server.

3. The system of claim 2, wherein the provenance logs form a provenance state model that represents a present state of data flows at the instrumented application.

4. The system of claim 3, wherein the provenance state model is built from a combination of provenance logs from a plurality of client devices to represent a global state of data flows.

5. The system of claim 4, wherein the one or more instrumented libraries further provide a configuration interface that can receive commands and alter the behavior of the instrumented application.

6. The system of claim 1, wherein the data operations comprise file system calls.

7. A system for tracking provenance information, comprising:
   an instrumented application binary on a client device, wherein overwritten library call instructions provide library calls to one or more instrumented libraries that invoke a provenance layer to track data operations, wherein the provenance layer is configured to catch and log data events performed by the instrumented application and wherein the instrumented libraries further provide a configuration interface that can receive commands and alter the behavior of the instrumented application; and
   a provenance server that includes a processor configured to identify the client device and to receive a provenance log from the provenance layer, wherein said provenance log includes the logged data events.

8. The system of claim 7, wherein the provenance server is further configured to build a provenance state model that represents a present state of data flows at the client device using the provenance logs.

9. The system of claim 7, wherein the configuration is further configured to receive commands from the provenance server in accordance with a global state of data flows and one or more data policies.

10. A non-transitory computer readable storage medium comprising computer readable program for enabling an application to track provenance information, wherein the computer readable program when executed on a computer causes the computer to perform the steps of:
   analyzing an application binary to discover injection points for provenance tracking code, wherein said injection points correspond to existing library calls;
   overwriting instructions in the application binary at the injection points with a processor to create an instrumented application, wherein the overwritten instructions provide library calls to one or more instrumented libraries that invoke a provenance layer to track data operations; and
   deploying the instrumented application on a client device.

* * * * *